United States Patent [19]

Choi

[11] Patent Number: 5,667,044

[45] Date of Patent: Sep. 16, 1997

[54] TRANSMISSION DEVICE FOR AUTOMOBILE

[75] Inventor: Manlim Choi, Kyungsangnam-do, Rep. of Korea

[73] Assignee: Hyundai Motor Company, Seoul, Rep. of Korea

[21] Appl. No.: 475,603

[22] Filed: Jun. 7, 1995

[51] Int. Cl.[6] .................................................. B60K 41/22
[52] U.S. Cl. ........................ 192/3.58; 74/335; 192/3.63
[58] Field of Search ............................. 192/3.58, 3.62, 192/3.63; 477/79, 80; 74/335, 336 R

[56] References Cited

U.S. PATENT DOCUMENTS

| | | | |
|---|---|---|---|
| 3,876,028 | 4/1975 | Asano et al. | 477/80 X |
| 4,497,222 | 2/1985 | Nagaoka et al. | 477/79 X |
| 4,601,369 | 7/1986 | Hattori et al. | 192/3.62 X |
| 4,653,352 | 3/1987 | Nakao et al. | 74/335 X |
| 4,784,007 | 11/1988 | Ishida et al. | 74/335 |
| 4,843,902 | 7/1989 | Patton et al. | 74/335 |
| 4,855,913 | 8/1989 | Brekkestran et al. | 477/80 X |
| 5,014,832 | 5/1991 | Satoh et al. | 192/30 W |
| 5,029,678 | 7/1991 | Koshizawa | 192/30 W X |
| 5,035,113 | 7/1991 | Simonyi et al. | 192/3.58 X |
| 5,167,311 | 12/1992 | Satoh et al. | 192/3.58 X |

*Primary Examiner*—Rodney H. Bonck

[57] ABSTRACT

A transmission device for a vehicle includes a clutch for selectively transferring power from an engine to the transmission device, at least two shift rails for causing the transmission device to achieve a plurality of transmission speed ratios, a shift rail actuating member for selectively engaging and actuating one of the shift rails, a clutch actuator selectively actuating the clutch, a select actuator actuating the shift rail actuating member to select one of the shift rails, and a shift actuator, independent of the select actuator, actuating the shift rail actuating member to actuate the selected one of the shift rails. A servo valve controls direction and flow of oil pressure from an oil pressure pump, and first, second and third solenoid valves are disposed between the servo valve and the clutch actuator, select actuator, and the shift actuator, respectively. the clutch actuator, select actuator and shift actuator function based on oil pressure received from the servo valve as regulated by the first, second and third solenoid valves, respectively. A microprocessor controls the servo valve and the first, second and third solenoid valves in accordance with a traveling condition of a vehicle.

9 Claims, 12 Drawing Sheets

TRANSMISSION DEVICE FOR AUTOMOBILE

BACKGROUND OF THE INVENTION

1. Field of the Invention

The invention relates to a transmission device for an automobile and, more particularly, to the transmission device for an automobile that can operate a manual transmission device automatically to increase convenience in driving.

2. Description of the Prior Art

A manual transmission device for an automobile has a clutch to connect or disconnect the engine to the transmission.

The clutch disconnects the engine from the transmission during the time the gears in the transmission are being shifted.

Generally, oil pressures produced in a master cylinder are used to operate the clutch.

Shifting a gear ratio consists of a shift operation that moves a change lever to left or right and a select operation that moves a change lever to forward or backward.

Since a driver controls the clutch and shifts a gear ratio by himself or herself, he or she gets weary and sometimes to fails to accomplish an appropriate gear ratio shifting.

Moreover, the engine room becomes complex because there need to be links or rods for controlling a shifting-gear ratio device which is connected to the change lever.

SUMMARY OF THE INVENTION

The invention has been made in an effort to solve the above problems.

It is an object of the invention to provide a transmission device for an automobile that can operate a conventional manual transmission device automatically.

It is another object of the invention to provide a transmission device for an automobile that can control a clutch by using a button arranged in a change lever instead of using a conventional clutch pedal.

To achieve the above object, the invention provides the transmission device for automobile which includes:

- a servo valve for controlling direction and flow of oil pressure from an oil pressure pump;
- a clutch actuator connected with the servo valve to receive oil pressure and actuate a clutch;
- a select actuator connected with the servo valve to receive oil pressure and move a select lever;
- a shift actuator connected with the servo valve to receive oil pressure and move a shift lever;
- three solenoid valves each disposed between the servo valve and the respective actuators to selectively feed the oil pressure to the actuators;
- a microprocessor for controlling the servo valve and solenoid valves in accordance with the travelling condition of a vehicle to control the actuator; and
- a means for shifting gear ratio including a clutch, the select lever, and the shift lever.

The servo valve is provided with first and second ports communicating with first and second common passages, respectively, the first common passage having first, second and third branch passages, the second common passage having first, second and third branch passages, each actuator has first and second ports, the first solenoid valve selectively communicates the first branch passages of the respective first and second common passages with the first and second ports of the clutch actuator, respectively, the second solenoid valve selectively communicates the second branch passages of the respective first and second common passages with the first and second ports of the select actuator, respectively, and the third solenoid valve selectively communicates the third branch passages of the respective first and second common passages with the first and second ports of the shift actuator, respectively.

The transmission device further comprises a potentiometer arranged in a change lever to operate the clutch automatically or manually.

The select actuator comprises a casing, a rotary piston rotatably arranged in the casing, and a potentiometer for detecting the amount of revolution of the rotary piston.

The shift actuator comprises a casing, a rotary piston rotatably arranged in the casing, and a potentiometer for detecting the amount of revolution of the rotary piston.

The clutch actuator is a linear actuator.

The clutch actuator includes a potentiometer. The first and second common passages and all of the first, second, and third branch passages are formed integrally in one manifold body.

DETAILED DESCRIPTION OF A PREFERRED EMBODIMENT

Now the invention will be described in detail with reference to the drawings.

Figure 1:
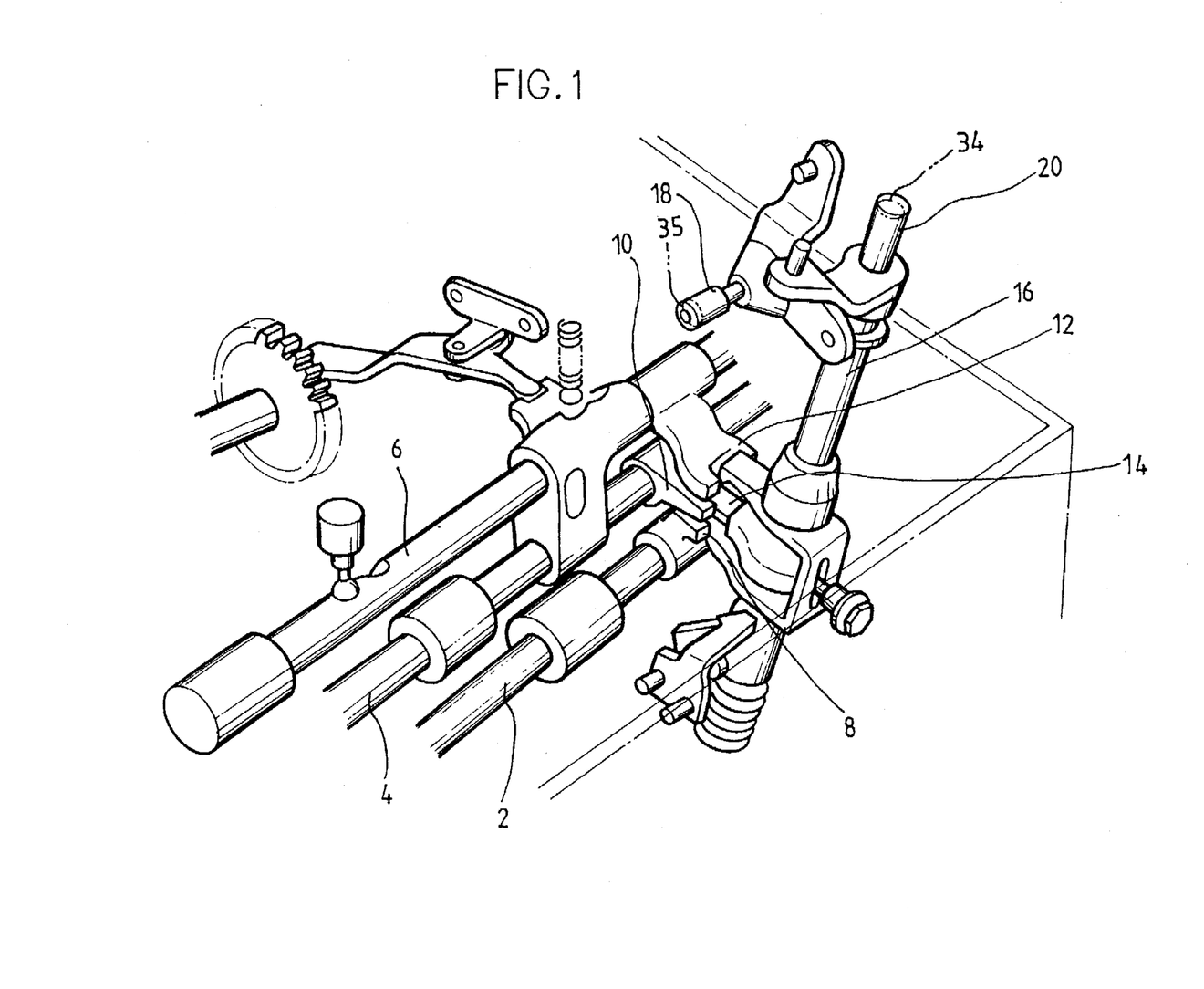
FIG. 1 is a partial perspective view of a transmission device in a preferred embodiment of the invention.

FIG. 1 illustrates a first to second speed shift rail 2, a third to forth speed shift rail 4, and a fifth speed to reverse shift rail 6.

A shift fork is provided in the rails, but not shown in FIG. 1, so that it is possible to synchronize.

The shift rails have shift lugs 8, 10, and 12, respectively, and a control finger 14 for selecting one of the shift lugs 8, 10, and 12 is provided in a shaft 16.

The shaft 16 is provided with a select actuator 18 in a select lever for moving the shaft 16 in longitudinal direction and a shift actuator 20 in the shift lever for moving the shaft 16 in rotational direction.

Figure 2A:
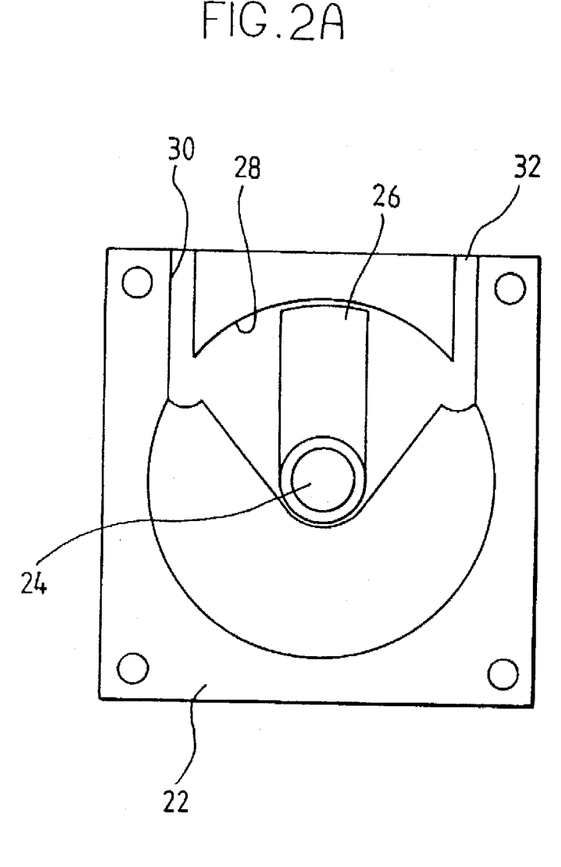
FIGS. 2A and 2b are views illustrating a structure of a rotary piston in a preferred embodiment of the invention.
Figure 2B:
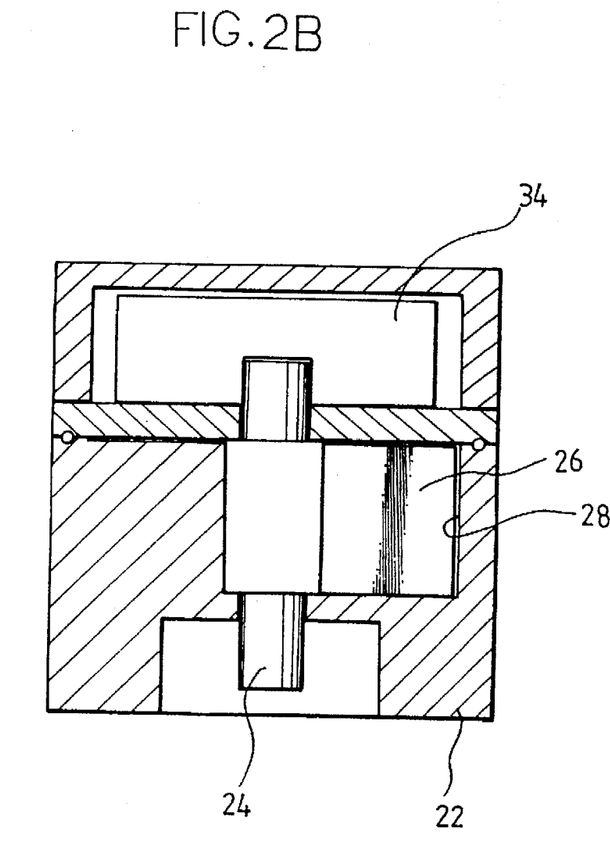

The select actuator 18 includes a casing 22, a shaft 24 provided in the inner side of the casing 22 rotatably, and a rotary piston 26 combined with the shaft 24 (see FIG. 2A).

The rotary piston 26 rotates to left or right in a chamber 28 in the casing 22 and there are a first port 30 and a second port 32 to supply oil pressure into the chamber 28 for rotating the rotary piston 26.

The casing 22 can be made by combining split cover body using fastening elements like bolts and a potentiometer 34 is provided in the inner side of the cover body for detecting the amount of rotation of rotary piston 26 and then the detected signal is transmitted to a microprocessor as shown below.

The shift actuator 20 has the same structure as the select actuator 18 and a potentiometer, a first port, and a second port of the shift actuator 20 are numbered 35, 31, and 33 respectively.

Figure 3:
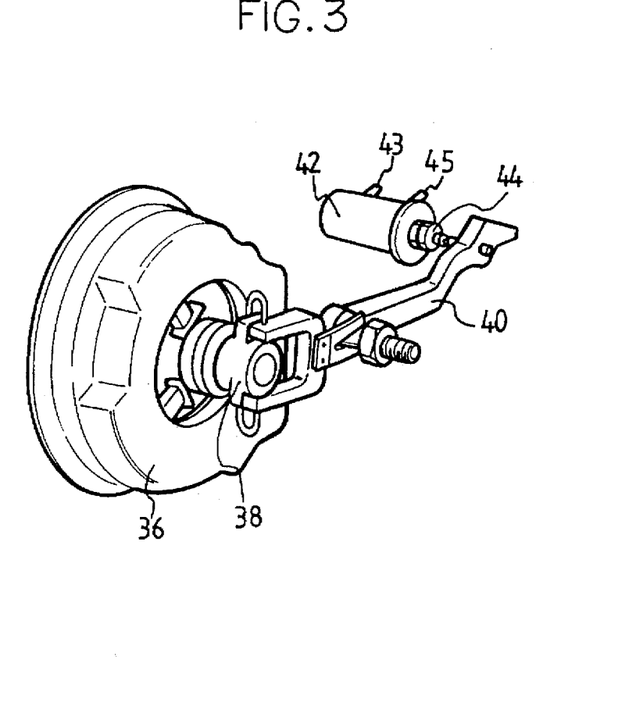
FIG. 3 is a partial perspective view of a clutch operation device in a preferred embodiment of the invention.

FIG. 3 illustrates a clutch control unit including a clutch cover 36, a release bearing 38 protruding from the rear of the clutch cover 36 and splined to a input shaft of a transmission, a release fork 40 connected with the release bearing 38, and a clutch actuator 42 arranged at the end of the fork 40.

The clutch actuator 42 is a linear actuator having a potentiometer 44 for detecting amount of movement of the actuator 42 and first and second ports 43, 45 for supplying oil pressure to the actuator 42.

Figure 4:
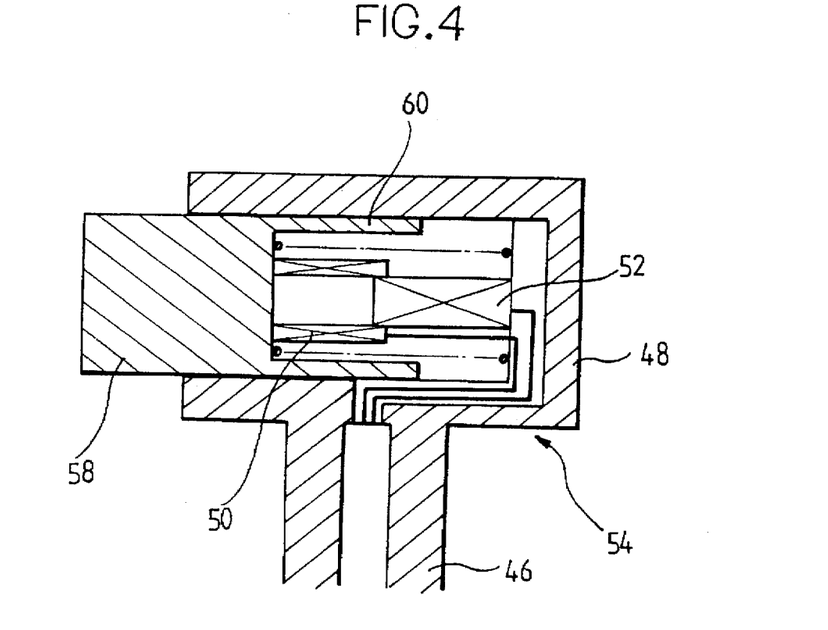
FIG. 4 is a side section view of a head part of a change lever in a preferred embodiment of the invention.

FIG. 4 illustrates a side section view of a grip part of a change lever 46 including a head part 48 formed integrally in a upper part of the change lever 46, a movable electrode element 50 arranged in the inner side of the head part 48 slidably, and a variable resistor element 52 fixed in the inner side of the head part 48.

Figure 9:
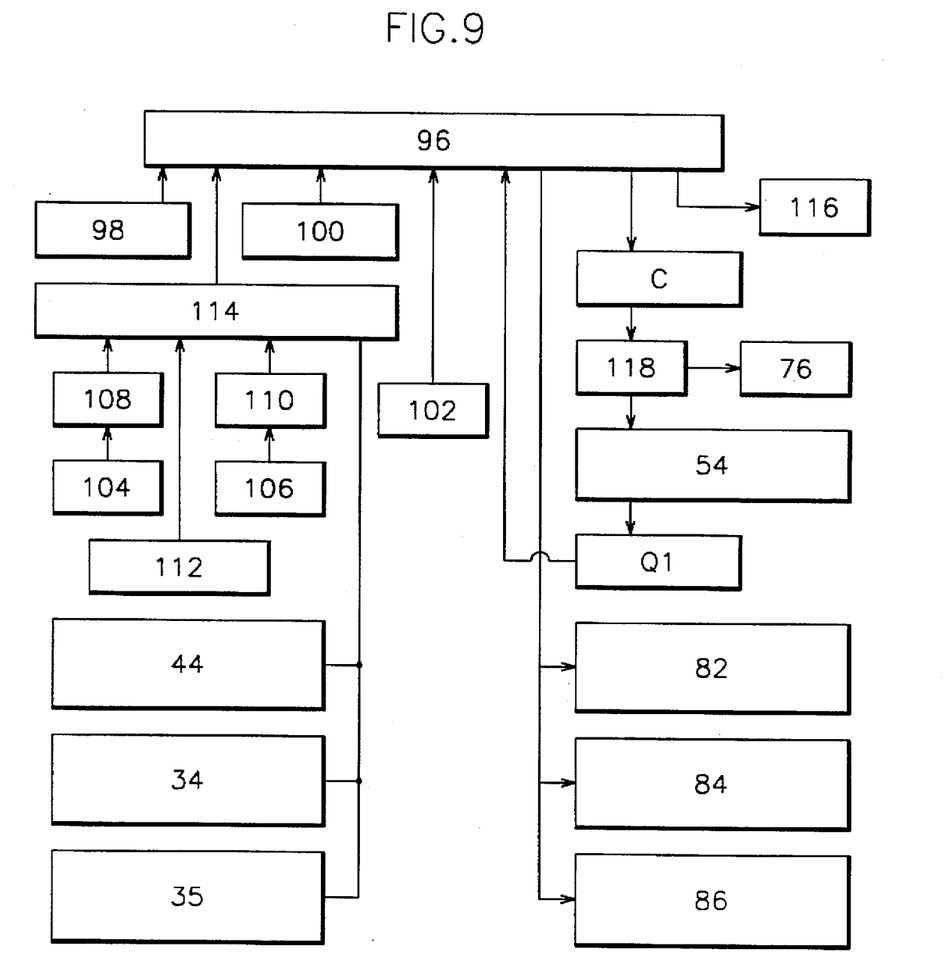
FIG. 9 is a block diagram showing how to control the actuators.

The movable electrode element 50 and the variable resistor element 52 compose a potentiometer 54 substantially and are connected with an input terminal of the microprocessor 96 as shown in FIG. 9.

The movable electrode element 50 is fixed in a push button 58, that it moves with the push button 58 when the push button 58 is pressed.

The push button 58 has a stopper 60 to prevent from over-pressing.

Figure 5:
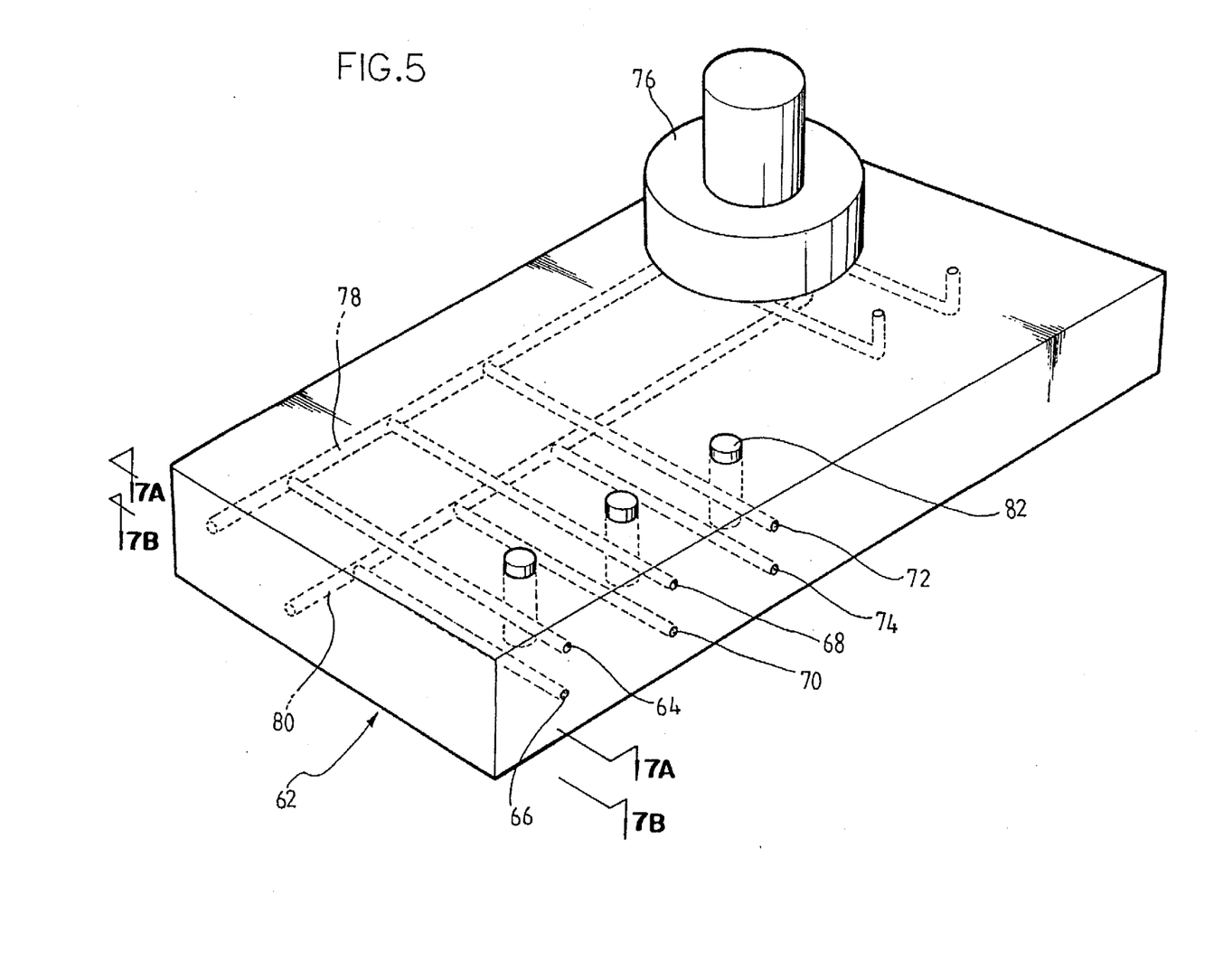
FIG. 5 is a perspective view of a manifold in a preferred embodiment of the invention.
Figure 6:
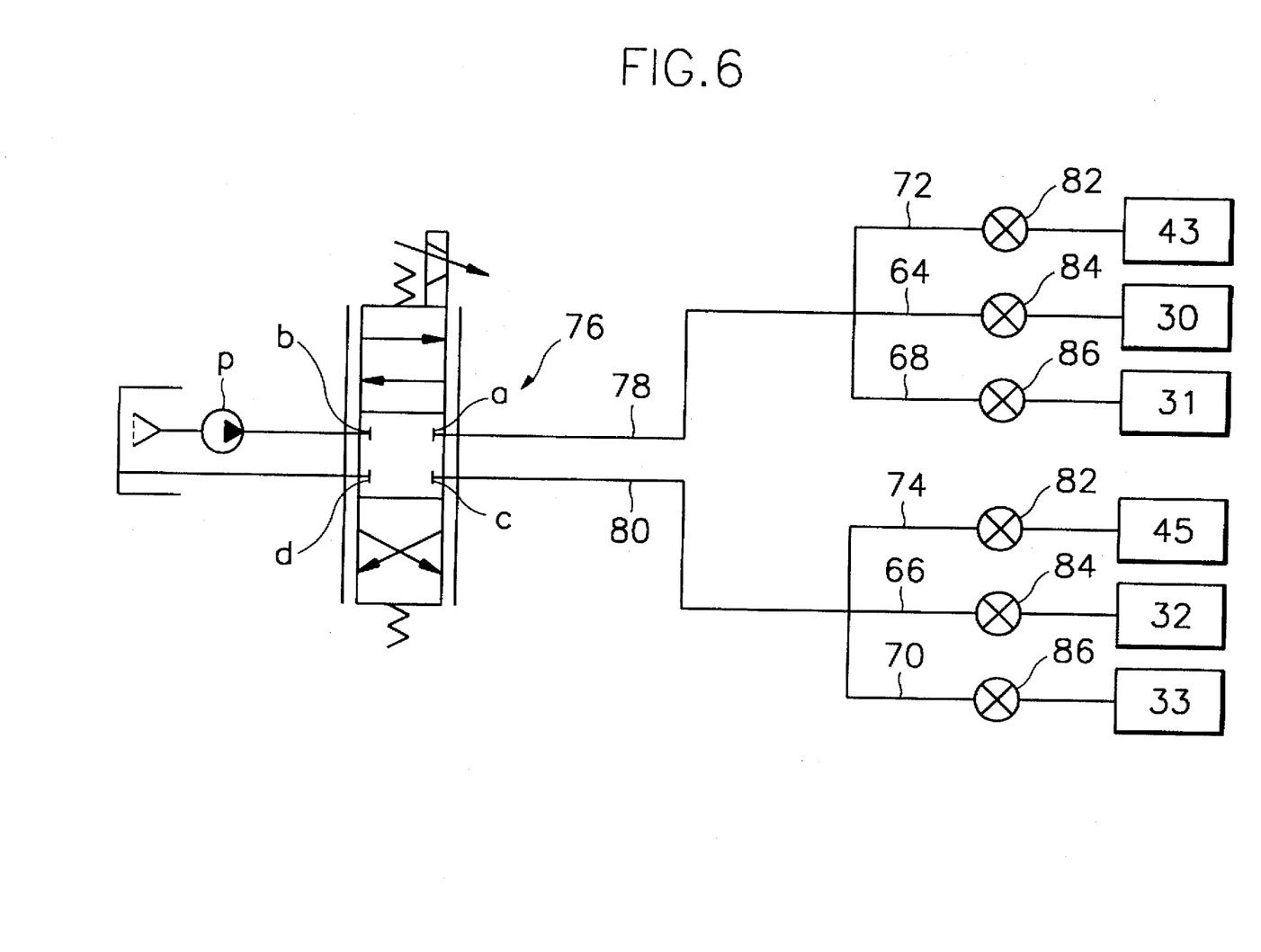
FIG. 6 is a hydraulic circuit diagram showing how oil pressures are supplied to actuators.

FIGS. 5 and 6 show an oil pressure supply unit for operating the select actuator 18, the shift actuator 20, and the clutch actuator 42.

A manifold body 62 has first branch passages 72, 74 for supplying oil pressure into the clutch actuator 42.

The manifold body 62 has second branch passages 64, 66 for supplying oil pressure into the first and second ports 30, 32 of the select actuator 18.

And the manifold body 62 has third passages 68, 70 for supplying oil pressure into the first and second ports 31, 33 of the shift actuator 20.

The passages 64, 68, and 72 and the passages 66, 70, and 74 are connected to first and second common passages 78, 80, respectively, which are connected with a servo valve 76.

Then the oil pressure are supplied to the first and second common passages selectively from the servo valve 76.

The servo valve 76 provided in the invention is a general type which controls flow in accordance with a electrical input signal so that all kinds of servo valves can be used.

Figure 7A:
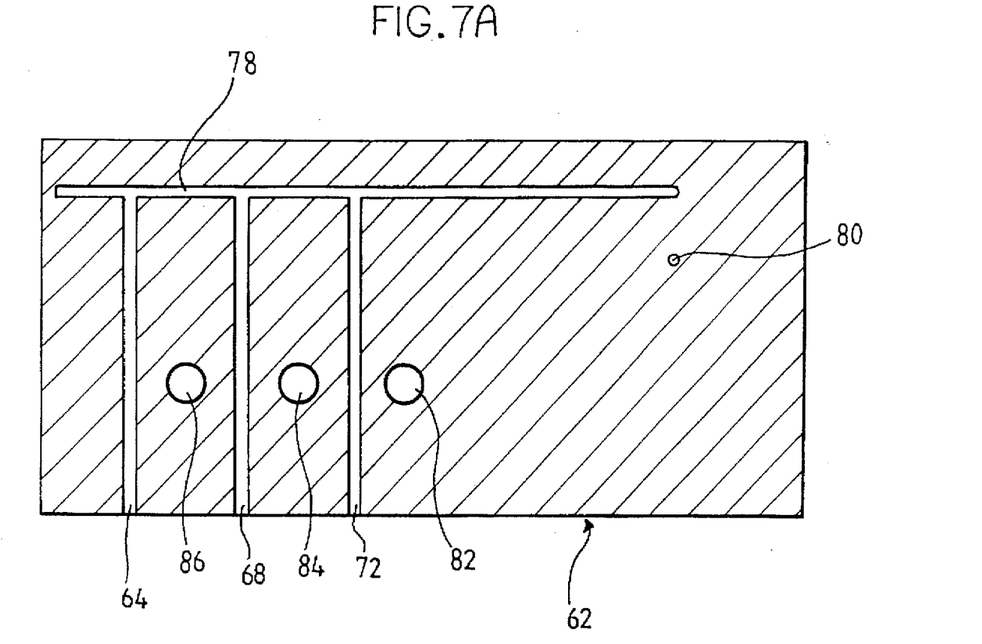
FIG. 7A is a section view taken along the line A—A in FIG. 5.
Figure 7B:
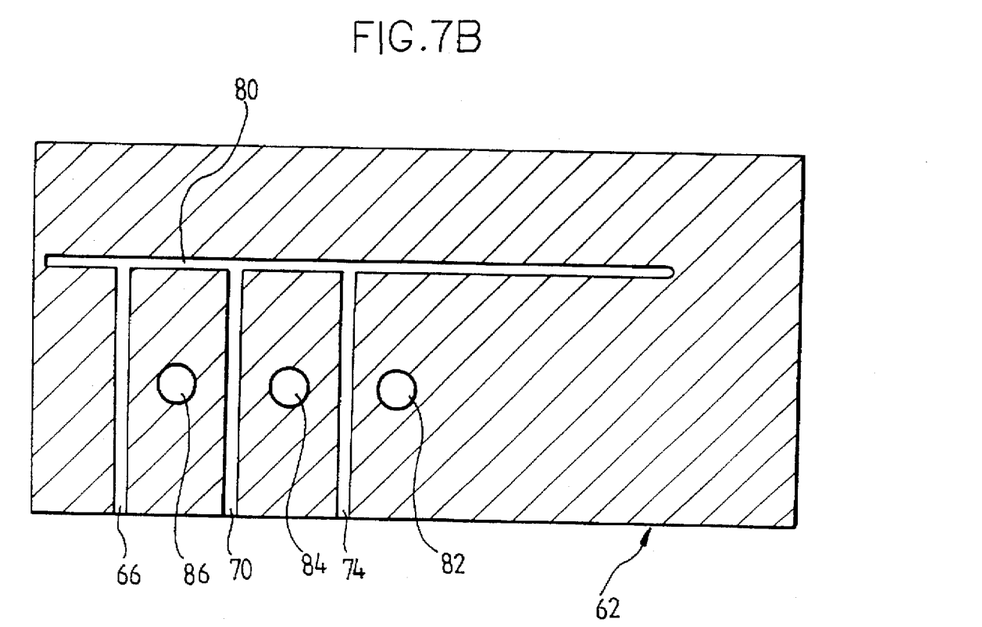
FIG. 7B is a section view taken along the line B—B in FIG. 5.

FIGS. 7A and 7B are section views taken along the lines 7A—7A, and 7B—7B, respectively.

The first common passage 78 and the second common passage 80 are located at different height and the branch passages are provided with solenoid valves 82, 84, and 86 to open or shut each of the branch passages selectively.

Figure 8:
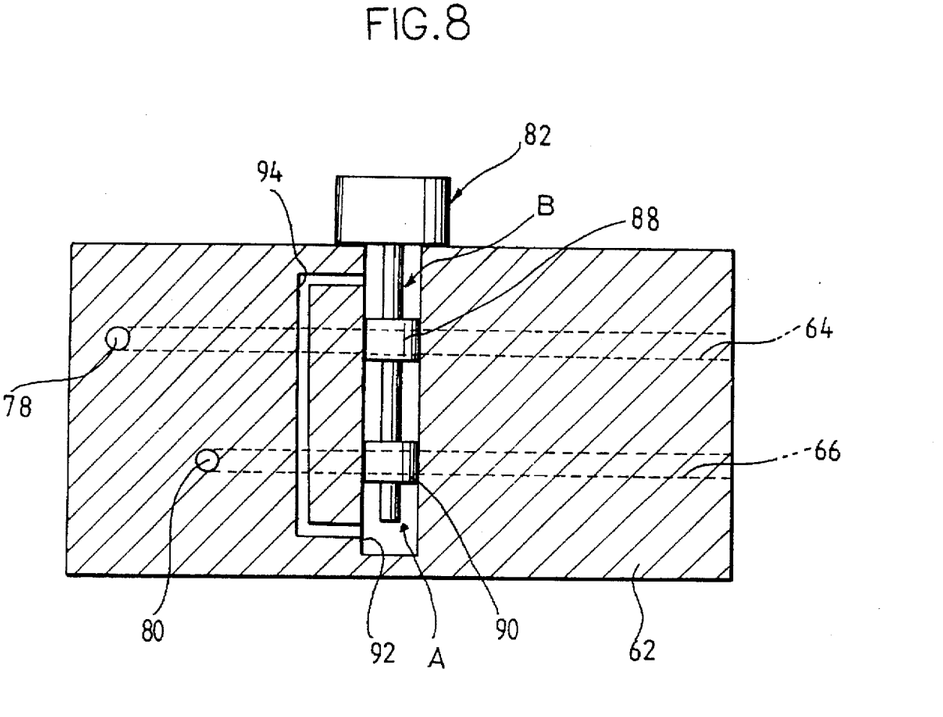
FIG. 8 is a side section view of a solenoid valve part in a preferred embodiment of the invention.

FIG. 8 shows a side section view of the solenoid valve, and all solenoid valves have the same structure.

There is a valve spool having a first land 88 and a second land 90 for shutting the branch passages in the solenoid valve.

The valve spool is movably arranged in a groove 92 formed in the manifold 62 and the groove 92 is longer than the length of the valve spool for the first and second lands to move.

Since a fluid is supplied into an area A in the groove 92 when the valve spool is moved to open the branch passages, a by-pass passage 94 is provided in the manifold 62 for transferring the fluid supplied in the area A to an area B when the valve spool is returned to its initial position.

FIG. 9 shows a block diagram illustrating how to control the actuators.

The input terminal of the micro processor 96 has connection with a brake on/off switch 98, an auto/manual converting switch 100, a change lever position sensing sensor 102, a tachometer part 104, a vehicle speed sensing sensor part 106, an accelerating pedal position sensing sensor part 112, and the potentiometers 34, 35, and 44.

The brake on/off switch 98 is for detecting braking condition.

The auto/manual converting switch 100 is for selecting an automatic or manual gear shifting, which is composed of the push button 58 and the potentiometer 54.

The change lever position sensing sensor 102 is for sensing the position of the change lever which determines at what speed stage the change lever is located.

The tachometer part 104 is for sensing the speed of revolution of the engine and the vehicle speed sensing sensor part 106 is for sensing the speed of vehicle.

The tachometer part 104 and the vehicle speed sensing sensor 106 are connected with the microprocessor through an F/V converter 108, 110, respectively, and then through an A/D converter 114.

The F/V converter is for converting frequency to voltage and the A/D converter is for converting an analog signal to a digital signal.

The accelerating pedal position sensing sensor part 112 is for detecting the amount of pressing of an accelerating pedal.

The potentiometers 34, 35, and 44 of the select actuator, the shift actuator, and the clutch actuator, respectively, are connected to the micro processor 96 through the A/D converter 114.

Now, an output relation of the microprocessor is described below.

A warning part 116 is connected for informing that the position of the change lever is in a position that a vehicle cannot start.

There is an amplifier 118, through which an armature of the servo valve 76 is connected, that the servo valve 76 operates in accordance with an output signal from the microprocessor.

The amplifier 118 is connected with the potentiometer 54 for receiving a signal representing how much the push button 58 is pressed.

The clutch solenoid valve 82, shift solenoid valve 84, and select solenoid valve 86 are connected with the microprocessor, so that the microprocessor can control the valves.

Figure 10:
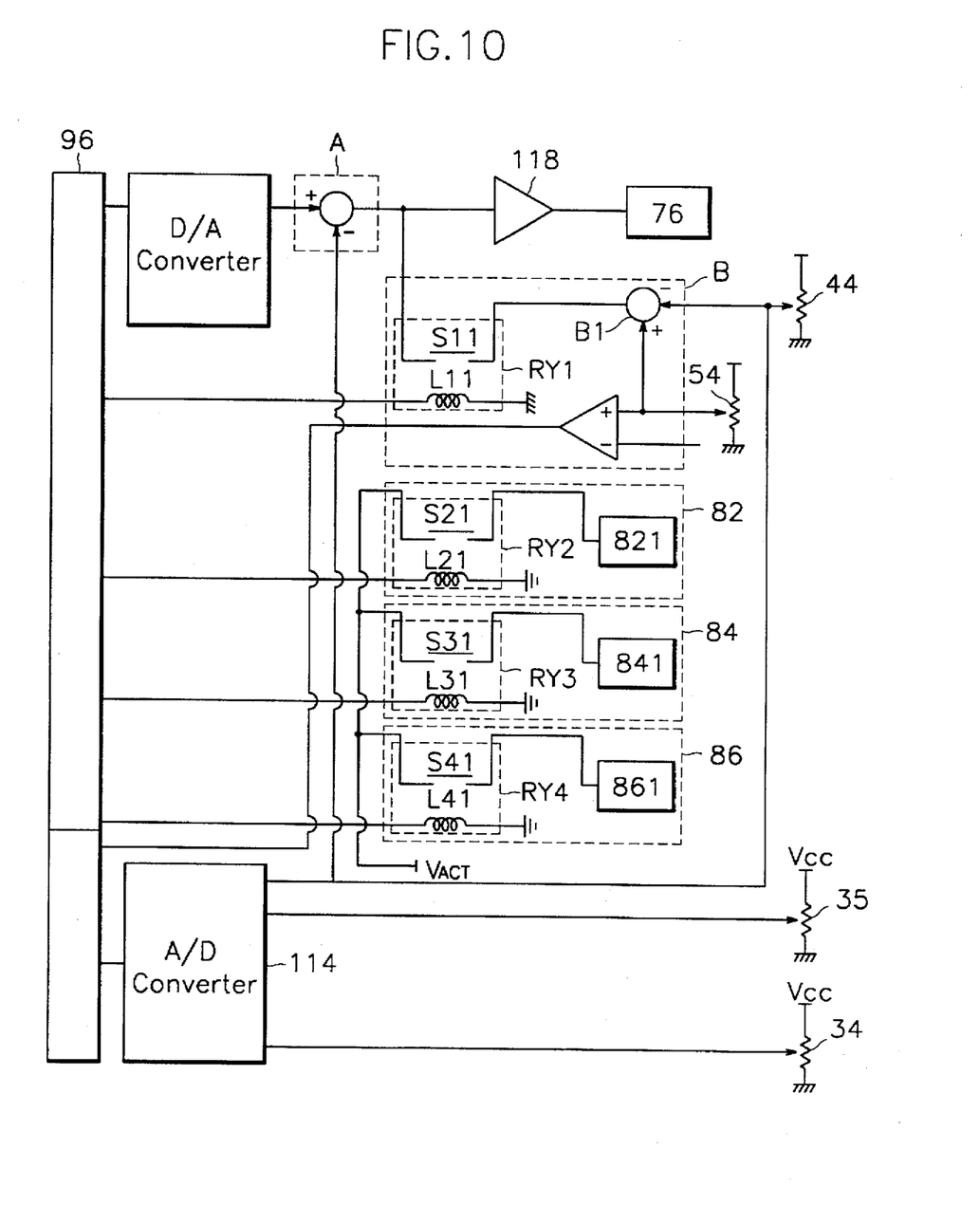
FIG. 10 is a control circuit diagram of a servo valve in a preferred embodiment of the invention.

FIG. 10 is a control circuit diagram of the servo valve 76.

An automatic clutch control part (A) is a comparative part in which a plus (+) terminal is connected to a D/A converter (C), a minus (−) terminal is connected to the potentiometer 44 of the clutch actuator 42, and an output terminal is connected to the amplifier 118.

A manual clutch control part (B) includes comparative part B1 in which an output terminal is connected to a relay RY1 connected with the output terminal of the automatic clutch control part (A), a (+) terminal is connected to a non-inverting terminal of a comparator Q1, and a (−) terminal is connected to the potentiometer 44 of the clutch actuator 42.

The relay RY1 includes a coil L11, one terminal of which is connected to the microprocessor 96 and the other terminal of which is grounded, and a switch S11, one terminal of which is connected to the output terminal of the automatic clutch control part (A) and the other terminal of which is connected to a output terminal of the comparative part B1.

The solenoid valve part 82 for a clutch operation includes a relay RY2 connected with the microprocessor 96 and the solenoid valve 821 connected with the relay RY2.

The relay RY2 includes a coil L21, one terminal of which is connected to the microprocessor and the other terminal is earthed, and a switch S21, one terminal of which is connected to a reference voltage Vact and the other terminal is connected to the solenoid valve 821 for clutch operation.

The solenoid valve part 84 for shift operation includes a relay RY3 connected with the microprocessor 96 and the solenoid valve 841 connected with the relay RY3.

The relay RY3 includes a coil L31, one terminal of which is connected to the micro processor and the other terminal of which is grounded, and a switch S31, one terminal of which is connected to the reference voltage Vact and the other terminal of which is connected to the solenoid valve for shift operation.

The solenoid valve part 86 for select operation includes a relay RY4 connected with the microprocessor 96 and the solenoid valve 861 connected with the relay RY4.

The relay RY4 includes a coil L41, one terminal of which is connected to the microprocessor and the other terminal of which is earthed, and a switch S41, one terminal of which is connected to the reference voltage Vact and the other terminal of which is connected to the solenoid valve for select operation.

Now, the operation of the invention at times of manual operation is described below.

Firstly, when a driver presses the push button 58, the movable electrode element 50 contacts the variable resistor element 52 to change resistance value and then the potentiometer 54 emits the resistance value.

Accordingly, voltage corresponding to the resistance value is applied to the non-inverting terminal of the comparator Q1.

If the voltage applied to the non-inverting terminal of the comparator Q1 is larger than that applied to an inverting terminal of the comparator Q1 connected to the reference voltage Vact, the output terminal of the comparator Q1 emits a high level signal H.

But if the voltage applied to the non-inverting terminal is less than that applied to the inverting terminal, the output terminal emits a low level signal L.

When the output signal from the comparator Q1 is H, the microprocessor determines a manual clutch operation and emits a control signal for operating the solenoid valve part 82 for clutch operation and the manual clutch control part (B).

Accordingly, a current flows through the coil L11 and the coil L21, and then the relays RY1 and RY2 operate.

According to the operation of the relay RY2, the solenoid valve 821 for clutch operation operates, and then the clutch operates.

According to the operation of the relay RY1, an error signal, which is a difference between the signal from the potentiometer 54 representing the operation of the push button 58 and the signal from the potentiometer 44 representing the operation of the clutch actuator 42, is applied to the servo valve 76 through the amplifier 118 until the error signal becomes zero.

As a result, the clutch is controlled according to the operation of push button 58 by a driver.

Whereas, at times of automatic operation, the operation of the invention is perfomed in a different way.

If the push button 58 is not pressed, the output signal from the comparator Q1 is L to the microprocessor and then the microprocessor determines an automatic clutch operation.

Accordingly, the microprocessor emits the control signal for the operation of the relay RY2 of the solenoid valve part 82 for clutch operation, then the clutch operates.

In order that the clutch operates according to a set-up value in the microprocessor for operating the clutch actuator 42, the detected signal from potentiometer 44 is fed back.

Then the signal from potentiometer 44 is compared with a signal from the microprocessor through D/A converter representing the set-up value in the comparative part (A).

Consequently, an error signal, which is a difference between the above-compared two signals in comparative part (A), is applied to the servo valve 76 until the error signal becomes zero.

As a result, the clutch operates in accordance with the set-up value in the microprocessor.

The shift solenoid valve part 84 and the select solenoid valve part 86 also operates in the same way as described above.

When the servo valve 76 operates, a port a and a port b are connected, and a port c and a port d are connected.

Then the oil pressure flows to the first common passage 78 and is distributed into each of the passages 72, 64, and 68 then oil pressure flows into each of the first ports 43, 30, and 31 of the clutch actuator 42, the select actuator 18, and the shift actuator 20.

As a result, the actuators operate.

Firstly, the clutch actuator 42 operates then the release fork 40 moves and as a result, the clutch is disconnected as shown in FIG. 3.

And then the select actuator 18 operates and the shaft 16 moves in a longitudinal direction to move the control finger 14.

As a result, the control finger 14 is in the position opposing one of shift lug 8, 10, and 12.

Then the shift actuator 20 operates and moves the control finger 14.

The control finger 14 pushes the corresponding shift lug. Then the gear ratio shifting is completed.

The procedure of the gear ratio shifting is explained with reference to operational flow diagram in FIGS. 11 and 12.

First, in step S1 it is determined whether the position of the change lever 46 is in neutral position, and if the position is not in the neutral position, the microprocessor informs a driver of the fact through the warning part 116.

And if in the neutral position, in step S2 ignition is prepared, and in step S3 it is detertermined whether the engine runs.

In this case, if the engine does not run, the operation is returned to step S1, and if the engine runs, in step S4 it is determined whether the position of the change lever 46 is changed.

If the position is not changed, a driver selects gear ratio shifting mode, i.e. whether to operate automatically or manually, through auto/manual converting switch 100.

And if the manual mode is selected, the operation is returned to step S4, and if the automatic mode is selected, all operations for the gear ratio shifting are executed automatically.

In the returned step S4, the position of the change lever is determined again, and if the position is changed, then step "D" operates.

The step "D" is explained with reference to operational flow diagram in FIG. 12.

In step S1-1, the solenoid valve 821 is turned on, in step S1-2 the clutch actuator 42 operates quickly, in step S1-3 the clutch is disconnected, and then in step S1-4 the disconnecting operation is completed.

At this time, the operation is returned to step S1-3 if the disconnecting is not completed but the operation is returned through step S1-5 in which solenoid valve 821 is turned off if the disconnecting is completed.

And then in step S5 it is determined whether the gear ratio is first speed stage or not.

If the gear ratio is first speed stage, step "E" operates.

Figure 13:
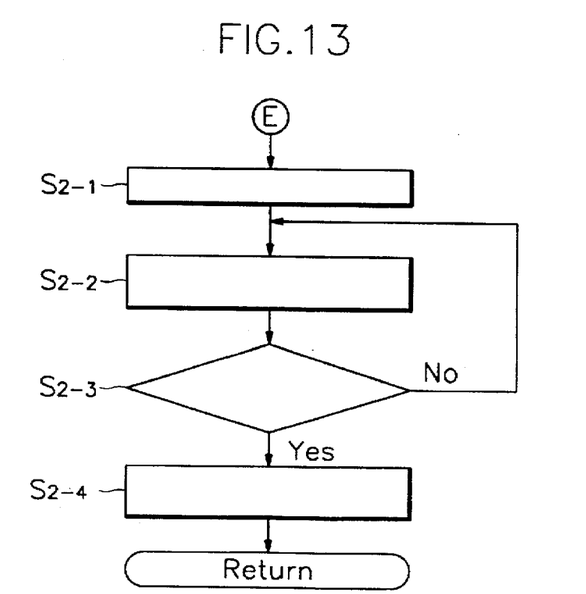
FIG. 13 is an operation flow diagram showing E step in FIG. 11.

The operation of the step "E" is shown in FIG. 13.

In step S2-1 the select solenoid valve 841 is turned on, in step S2-2 the shaft 16 is moved to meet the lug 8 for first to second speed rail 2, and in step S2-3 the moving is completed.

At this time, if the moving is completed, the operation is returned through step S2-4 in which the select solenoid valve is turned off, and if the moving is not completed, the operation is returned to step S2-2.

Figure 14:
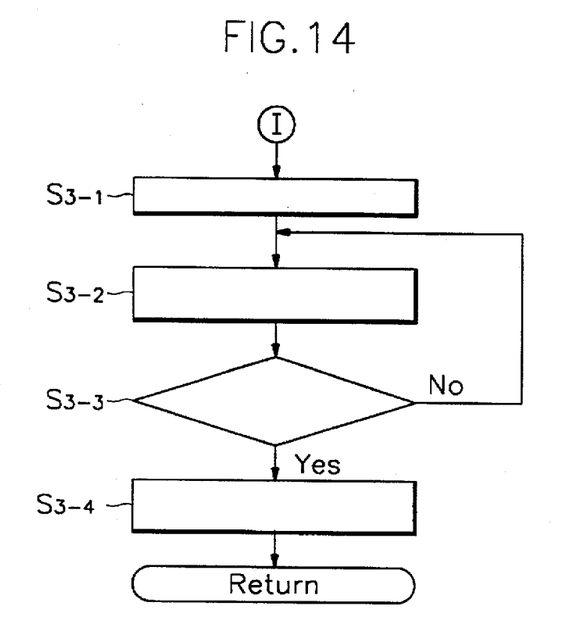
FIG. 14 is an operation flow diagram showing I step in FIG. 11.

Then step "T" is continued as shown in FIG. 14.

In step S3-1, the shift solenoid valve 861 is turned on, in step S3-2 the shaft 16 is moved to front, and then in step S3-3 the moving is completed.

At this time, if the moving is not completed, the operation is returned to step S3-2, and if the moving is completed, the operation is returned via step S3-4 in which the solenoid valve 861 is turned off.

After these operations are completed, the operation is continued to step S6, in which the clutch operation mode is selected, i.e, whether to operate automatically or manually.

The selection is determined by the signal from the potentiometer 54 produced by pressing the push button 58, and if the selection is not manual, step "B" operates.

Figure 15:
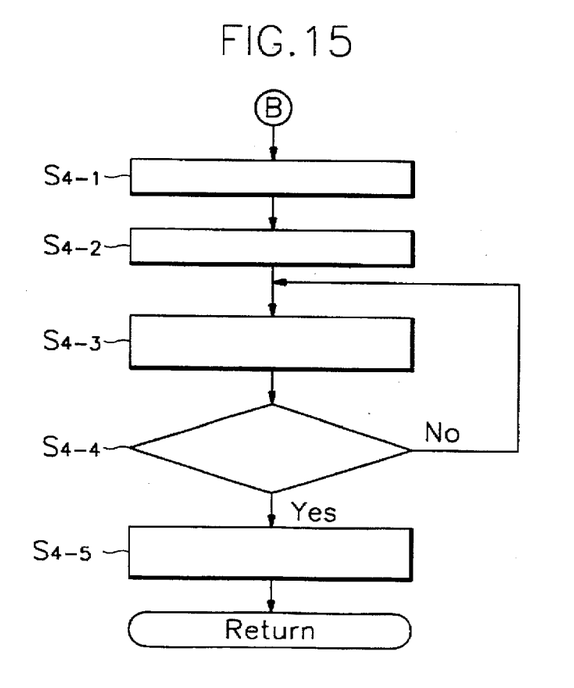
FIG. 15 is an operation flow diagram showing B step in FIG. 11.

The step "B" operation is shown in FIG. 15 and in step S4-1 the clutch solenoid valve 821 is turned on, in step S4-2 the clutch is slowed down, in step S4-3 the clutch is connected, and then in step S4-4 the connecting is completed.

At this time, if the connecting is not completed, the operation is returned to the step S4-3 and if the connecting is completed, the operation is returned through step S4-5 in which the solenoid valve 821 is turned off.

And if the manual mode is selected in step S6, the manual gear ratio shifting goes through step S7 in which the clutch solenoid valve 821 is turned on, step S8 in which the clutch actuator 42 is moved and the moving is completed, and step S9 in which the solenoid valve is turned off.

Figure 11:
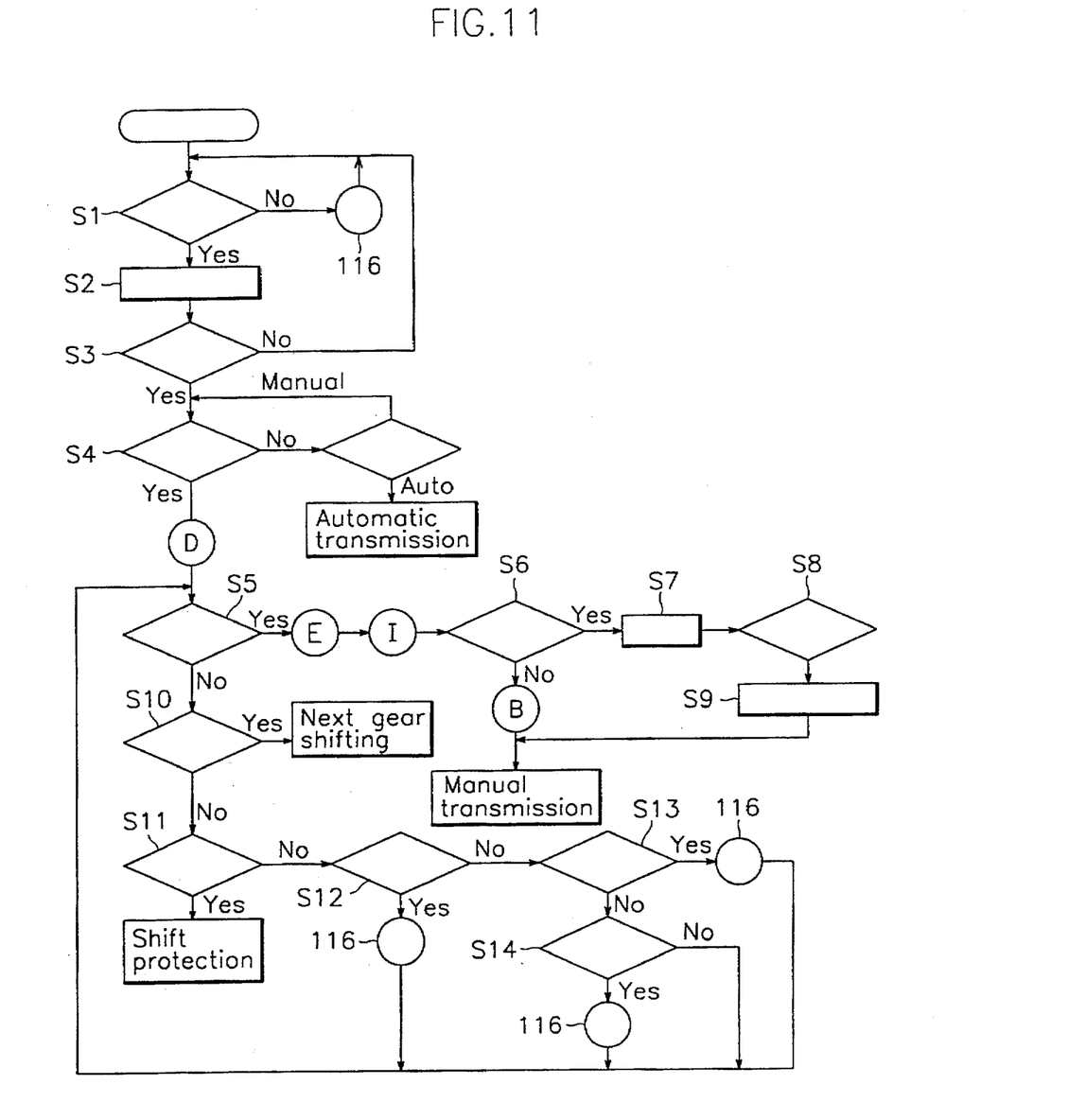
FIG. 11 is an operation flow diagram in a preferred embodiment of the invention.
Figure 12:
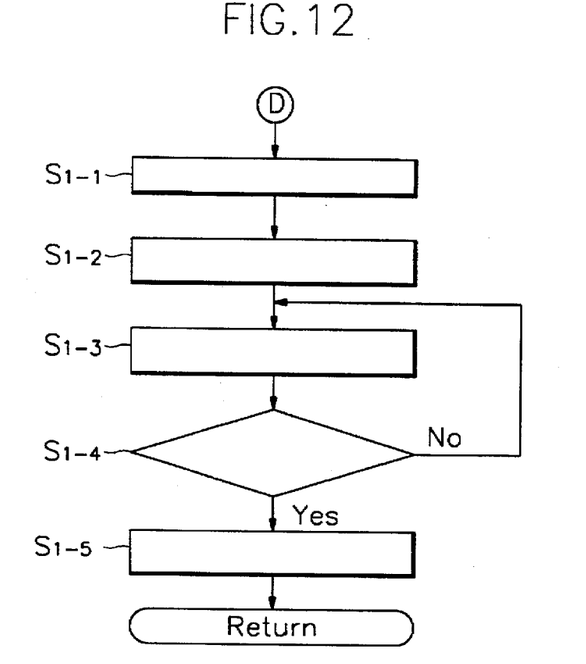
FIG. 12 is an operation flow diagram showing D step in FIG. 11.

On the other hand, in FIG. 11, if the speed stage is not first in step 5, the operation goes to step S10 in which whether the speed stage is second is determined.

At this time, if the speed stage is second, in step S10 the clutch is operated and then next gear ratio shifting is prepared.

And if the speed stage is not second, the operation goes to step S11 in which whether the speed stage is reverse is determined.

If the speed stage is reverse, in step S11 shift protection is performed.

And if the speed stage is not reverse, the operation goes to steps S12, S13 and S14, in which whether the speed stage is third, fourth, and fifth is determined, respectively, then warned via warning part 116.

Then the operation is returned to step S5 and after which gear shifting is continued.

What is claimed is:

1. A transmission device for a vehicle, comprising:
    a clutch for selectively transferring power from an engine to the transmission device;
    at least two shift rails for causing said transmission device to achieve a plurality of transmission speed ratios;
    shift rail actuating member for selectively engaging and actuating one of said shift rails;
    a clutch actuator selectively actuating said clutch;
    a select actuator actuating said shift rail actuating member to select one of said shift rails;
    a shift actuator, independent of said select actuator, causing said shift rail actuating member to actuate said selected one of said shift rails;
    a servo valve for controlling direction and flow of oil pressure from an oil pressure pump;
    a first solenoid valve disposed between said servo valve and said clutch actuator;
    a second solenoid valve disposed between said servo valve and said select actuator;
    a third solenoid valve disposed between said servo valve and said shift actuator; and
    said clutch actuator, select actuator and shift actuator functioning based on oil pressure received from said servo valve as regulated by said first, second and third solenoid valves, respectively.

2. The transmission device according to claim 1, further comprising:
    electronic control means for controlling said servo valve and said first, second and third solenoid valves in accordance with a traveling condition of the vehicle.

3. The device according the claim 2, further comprising a potentiometer arranged in a manual change lever indicating user selection of manual clutch operation; and said electronic control means controlling said clutch actuator in response to output from said potentiometer.

4. The transmission device according to claim 2, wherein the select actuator comprises a casing, a rotary piston rotatably arranged in the casing, and a potentiometer for detecting the amount of revolution of the rotary piston.

5. The transmission device according to claim 2, wherein the shift actuator comprises a casing, a rotary piston rotatably arranged in the casing, and a potentiometer for detecting the amount of revolution of the rotary piston.

6. The transmission device according to claim 1, wherein the clutch actuator includes a potentiometer for detecting an amount of displacement of the clutch actuator.

7. The transmission device according to claim 2, wherein the servo valve is provided with first and second common passages, respectively, the first common passage having first, second and third branch passages, the second common passage having first, second and third branch passages, each of said clutch, select and shift actuator having first and second ports, the first solenoid valve selectively communicating the first branch passages of the respective first and second common passages with the first and second ports of the clutch actuator, respectively, the second solenoid valve selectively communicating the second branch passages of the respective first and second common passages with the first and second ports of the select actuator, respectively, and the third solenoid valve selectively communicating the third branch passages of the respective first and second common passages with the first and second ports of the shift actuator, respectively.

8. The transmission device according to claim 7, wherein the first and second common passages and all the first, second, and third branch passages are formed integrally in one manifold body.

9. The transmission device according the claim 1, wherein the clutch actuator is a linear actuator.

* * * * *